(No Model.)
M. M. MILLER.
COTTON PLANTER.
No. 413,199. Patented Oct. 22, 1889.
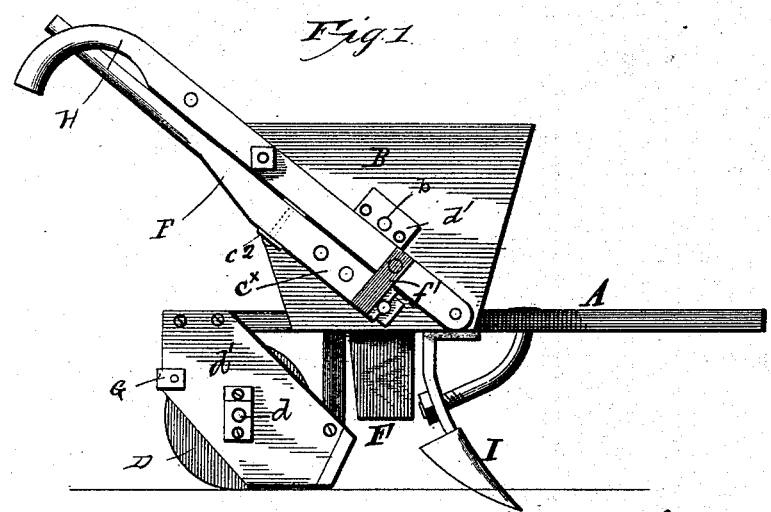
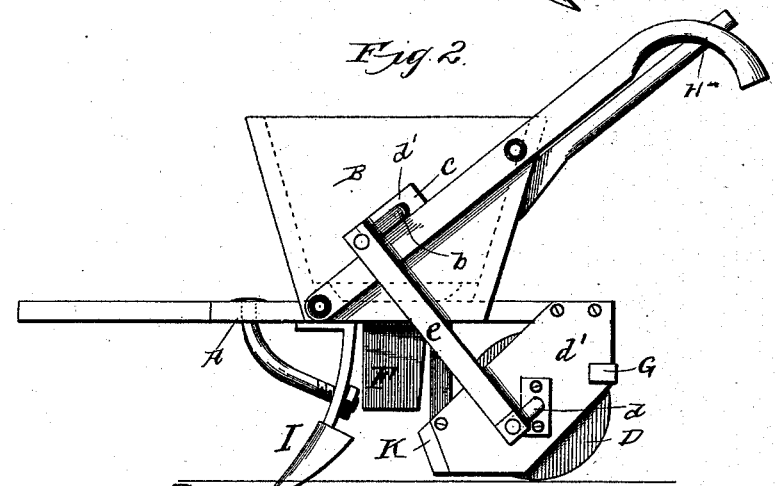
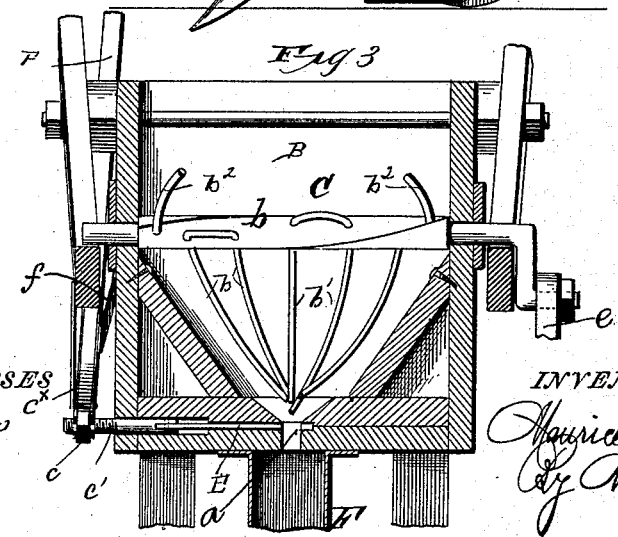
WITNESSES
INVENTOR

UNITED STATES PATENT OFFICE.

MAURICE M. MILLER, OF LAW'S HILL, MISSISSIPPI.

COTTON-PLANTER.

SPECIFICATION forming part of Letters Patent No. 413,199, dated October 22, 1889.

Application filed June 13, 1889. Serial No. 314,109. (No model.)

*To all whom it may concern:*

Be it known that I, MAURICE M. MILLER, a citizen of the United States of America, residing at Law's Hill, in the county of Marshall and State of Mississippi, have invented certain new and useful Improvements in Cotton-Planters, of which the following is a specification, reference being had therein to the accompanying drawings.

This invention is directed to certain improvements in combined planters and fertilizer-distributers; and it consists of the novel combination and construction of parts, as will more fully appear from the following description and accompanying illustration, in in which—

Figure 1 is a side elevation of my improved combined planter and fertilizer-distributer. Fig. 2 is an opposite side elevation thereof. Fig. 3 is a vertical sectional elevation of the same.

In the embodiment of my invention I employ a suitable frame A, upon which is mounted a hopper B, having in its bottom the seed and fertilizer discharge opening $a$. In the hopper and crosswise of its chamber is arranged and journaled the seed and fertilizer agitator C, which consists of a rocking or reciprocating crank-shaft $b$, having a spiral or twisted shape, somewhat after the fashion of an auger. The shaft $b$ is provided with stirrers or fingers $b'$ $b^2$, preferably seven, five reaching down and clearing the discharge-opening to permit the ready discharge or escape through said opening of the seed or fertilizer, as may be the case. The other two fingers or stirrers $b^2$ are so arranged as to project into and loosen the upper surface or portion of the fertilizer or seed.

D is a roller to cover the deposited seed or fertilizer, which has its crank-shaft $d$ journaled in oblique pendants $d'$ $d'$, applied to the sides of the frame A. The shaft $d$ of the roller D has connected to its crank a pitman $e$, which in turn is connected to the crank of the agitator or shaft $b$, the motion of the roller thus reciprocating or rocking the seed and fertilizer agitator.

E is a slide or gage, which consists of a plate arranged under the bottom of the hopper B and having its inner end adapted to wholly close the seed or fertilizer discharge opening $a$ or vary its discharging capacity. To these ends a nut $c$ is applied to a screw-extension $c'$ upon the outer end of the gage E and works in between the plate-extension $c^x$ on the lower end of a lever F, pivoted in a bracket $c^2$, secured upon one side of the hopper B, and having its outer or upper end within convenient reach of the hand of the operator or attendant. The lower end of the lever F is pressed outwardly by a flat spring $f$, secured to the hopper B and acting upon said lever, whereby, when the lever is released after pushing the slide or gage inward to close the seed or fertilizer discharge opening, the slide or gage will be automatically thrown or moved outward. The outward movement of said lever is limited by a stop $f'$ secured, it may be, to the lower end of one of the guide-handles, hereinafter referred to.

In being able to close the seed or fertilizer discharge opening of the hopper the seed or fertilizer is prevented from escaping or dropping when the machine is turned to reverse the direction of travel, thus effecting a saving of the seed and fertilizer.

G is a scraper, which is secured or disposed in position upon the upper or rear ends of pendants $d'$ and with relation to the roller D, so as to render the roller self-cleaning to free it of adhering dirt taken up by traction.

H H are the handles, which are bolted or secured to the frame A and the hopper B to guide the movement of the machine.

Upon the under side of the hopper-supporting frame A, near its forward end, is suitably secured an opening-plow I, while in alignment with the seed or fertilizer discharge opening is secured to the same frame a chute F, to conduct the discharged seed to the ground. To the lower forward ends of the front roller D is secured a transverse edgewise-disposed board or cover K, to aid the roller to cover the seed.

Having thus fully described my invention, what I claim, and desire to secure by Letters Patent, is—

The planter and distributer having the agitator consisting of a spiral or twisted shaft provided with a series of stirrers or fingers, one series comprising two inwardly-curved projecting fingers, one arranged near each end of the shaft, others of said stirrers or fingers being formed in pairs, each pair being in a single piece and passing through and projecting beyond the opposite side of the shaft, the projecting portions of the latter-referred-to fingers or stirrers converging at their free or distant ends, substantially as set forth.

In testimony whereof I affix my signature in presence of two witnesses.

MAURICE M. MILLER.

Witnesses:
ED. S. WATSON,
R. A. M. WILLIAMS.